(12) United States Patent
Zemba et al.

(10) Patent No.: US 7,743,988 B2
(45) Date of Patent: Jun. 29, 2010

(54) AUTHENTICATION SYSTEM INCLUDING ELECTRIC FIELD SENSOR

(75) Inventors: Akihiro Zemba, Sendai (JP); Hidetaka Fukazawa, Miyatoko (JP)

(73) Assignee: Freescale Semiconductor, Inc., Austin, TX (US)

( * ) Notice: Subject to any disclaimer, the term of this patent is extended or adjusted under 35 U.S.C. 154(b) by 234 days.

(21) Appl. No.: 12/175,470

(22) Filed: Jul. 18, 2008

(65) Prior Publication Data
US 2010/0012725 A1 Jan. 21, 2010

(51) Int. Cl.
*G06K 7/08* (2006.01)
*G06K 5/00* (2006.01)

(52) U.S. Cl. .................... 235/451; 235/375; 235/380; 235/382; 235/487; 235/492; 235/494

(58) Field of Classification Search ............... 235/375, 235/380, 382, 451, 487, 492, 494
See application file for complete search history.

(56) References Cited

U.S. PATENT DOCUMENTS

| | | | |
|---|---|---|---|
| 6,025,698 A | 2/2000 | Kim | |
| 6,457,126 B1 | 9/2002 | Nakamura | |
| 6,509,717 B2 | 1/2003 | Lee | |
| 6,975,092 B2 | 12/2005 | Edington | |
| 7,426,405 B2 * | 9/2008 | Lee | 455/575.1 |
| 2005/0194452 A1 * | 9/2005 | Nordentoft et al. | 235/492 |
| 2006/0097059 A1 * | 5/2006 | Miyazaki | 235/492 |
| 2006/0113381 A1 * | 6/2006 | Hochstein et al. | 235/382 |
| 2006/0196929 A1 * | 9/2006 | Kelley et al. | 235/380 |
| 2007/0220272 A1 * | 9/2007 | Campisi et al. | 713/186 |

FOREIGN PATENT DOCUMENTS

JP  2000-76063 B  3/2000

* cited by examiner

*Primary Examiner*—Seung H Lee
*Assistant Examiner*—Tuyen K Vo
(74) *Attorney, Agent, or Firm*—Charles Bergere

(57) ABSTRACT

An authentication system for reducing the power consumed during an authentication process and shortening the authentication time includes an electrode plate. The electrode plate has a unique shape that defines an authentication key. An electric field sensor detects capacitance corresponding to the shape of the electrode plate to generate a detection signal. A signal monitor compares the detection signal of the electric field sensor with a preset signal and generates a determination signal indicating the comparison result.

10 Claims, 5 Drawing Sheets

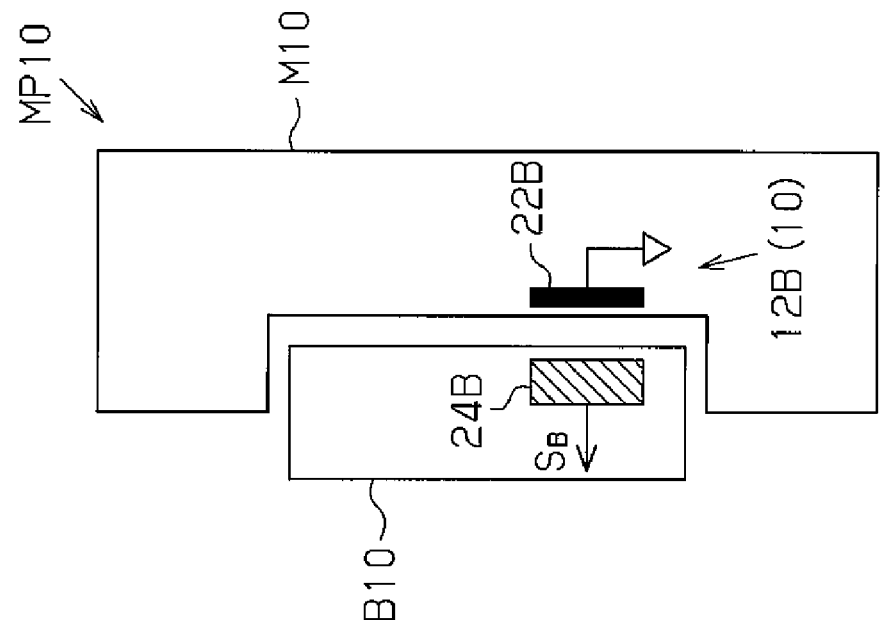
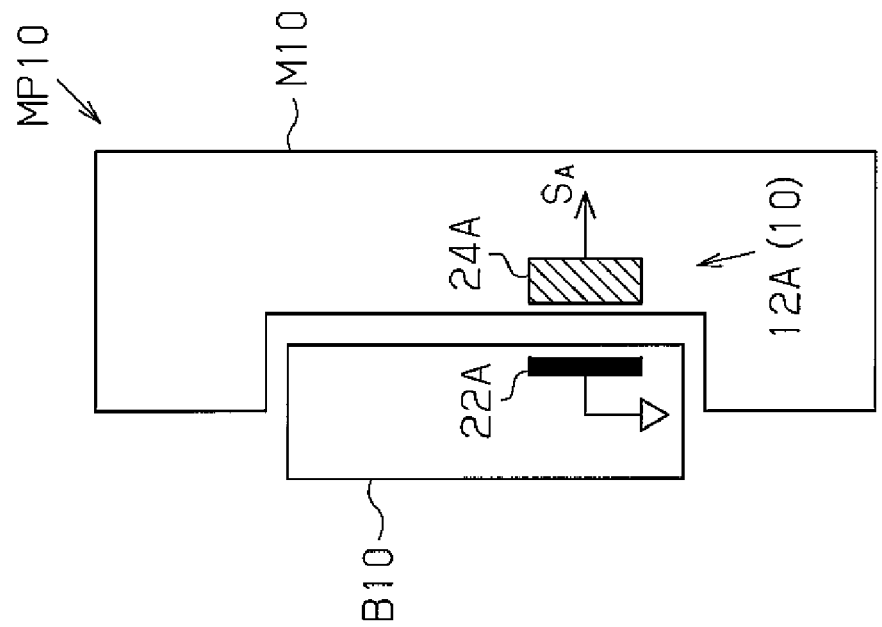

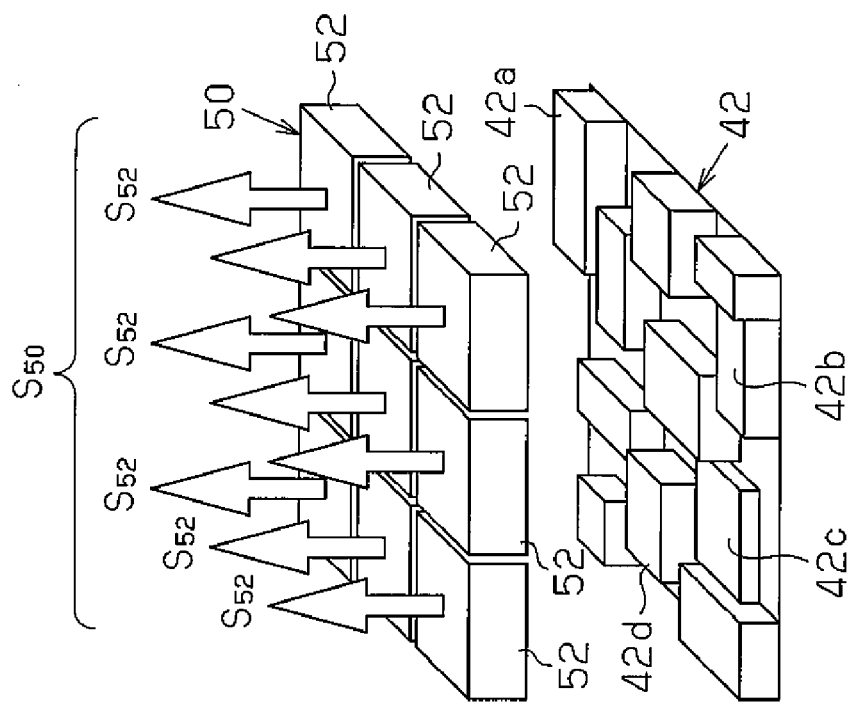
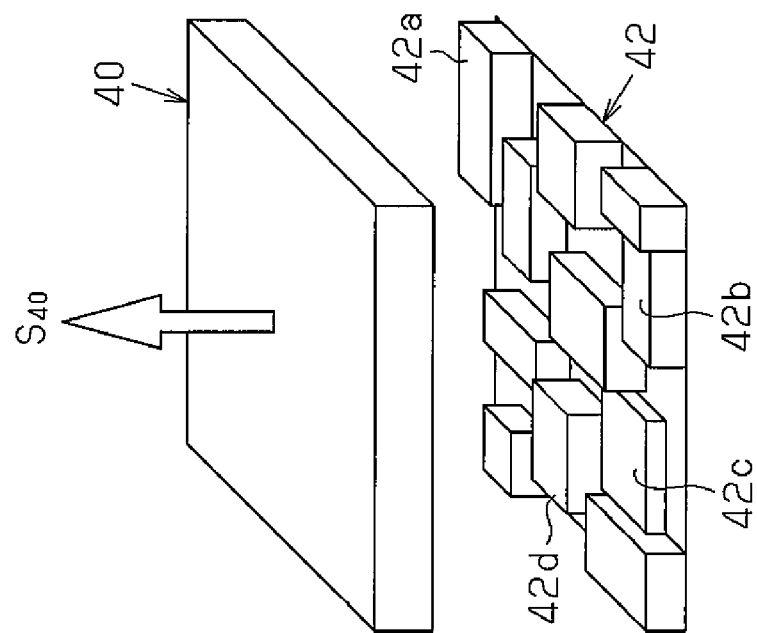

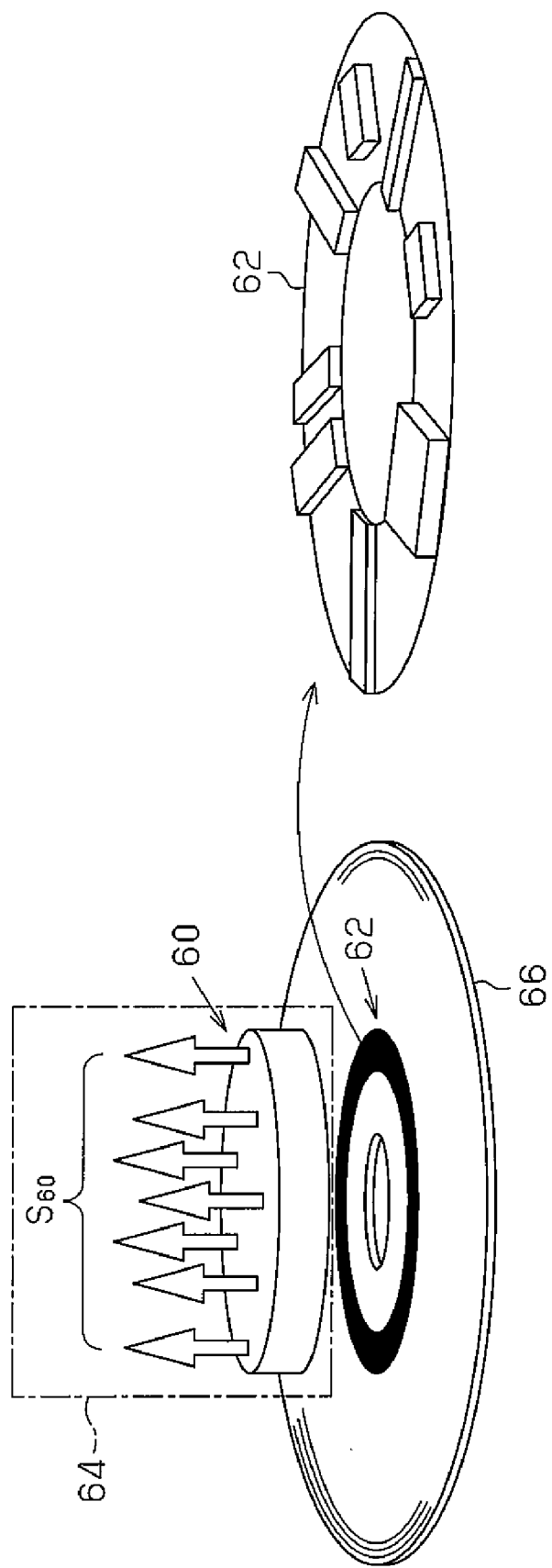

US 7,743,988 B2

AUTHENTICATION SYSTEM INCLUDING ELECTRIC FIELD SENSOR

BACKGROUND OF THE INVENTION

The present invention relates to an authentication system and more particularly, to an authentication system having an electric field sensor.

Nowadays, authentication systems are used in various types of devices. An authentication system authenticates a subject product that is connected to or used in a main body of a device to determine whether the subject product is authentic or authorized. The connection of an unauthentic subject product to the main body may result in erroneous operation, undesirable heating, or failure of the device. In addition to causing device failure, copyrights may be infringed if the use of the subject product is prohibited by copyright.

FIG. 1 is a block diagram showing a conventional authentication system 100 applied to a mobile phone MP100. The authentication system 100 performs authentication between a main body M100 (in this case, a battery charger) and a battery pack B100, which is connected to the main body M100. The battery pack B100 includes a power switch B14 arranged between a rechargeable battery B12 and a terminal T1 of the battery pack B100. The battery charger (main body M100) includes an internal circuit M12, which functions as a charging circuit, and a power switch M14, which is arranged between the internal circuit M12 and a terminal T2 of the main body M100. Connection of the battery pack B100 to the main body M100 connects the two power switches B14 and M14 to each other via the terminals T1 and T2. In such a state, when the power switches B14 and M14 are both activated, a charging path is formed between the rechargeable battery B12 and the internal circuit M12 so that the rechargeable battery B12 becomes rechargeable through the charging path.

The conventional authentication system 100 includes a host processor 112, which is arranged in the main body M100, and an authentication IC 114, which is arranged in the battery pack B100. Connection of the battery pack B100 to the main body M100 connects the host processor 112 and the authentication IC 114 to each other via a terminal T3 of the main body M100 and a terminal T4 of the battery pack B100. The host processor 112 stores a main body key K1, and the authentication IC 114 stores a product key K2. Japanese Laid-Open Patent Publication No. 2000-76063 describes a prior art authentication system that is similar to the authentication system 100 of FIG. 1.

In the authentication operation performed in the prior art system described above, the host processor 112 receives the product key K2 from the authentication IC114 and determines whether or not the product key K2 is authentic. If the received product key K2 is authentic, the host processor 112 activates the power switch M14. In the same manner, the authentication IC 114 receives the main body key K1 from the host processor 112 and determines whether or not the received main body key K1 is authentic. If the received main body key K1 is authentic, the authentication IC activates the power switch B14. When authentication cannot be established, either one of the power switches B14 and M14 is not activated. This prohibits charging.

In the conventional authentication system 100, authentication of the subject product (battery pack B100) requires electrical communication through a current path formed between the host processor 112 and the authentication IC 114. The electrical communication consumes power. In portable electronic equipment such as the mobile phone MP100, the authentication process uses the power of the rechargeable battery B12. However, the authentication process is not an essential operation of a device (here, the mobile phone) that implements the functions for performing the authentication process. Accordingly, there is a demand for reduction in the power consumed by the authentication process. Further, for quick activation of the device, it is desirable that the time required for authentication be shortened. However, in the authentication system 100 of the prior art, the requirement for electrical communication (mutual communication) between the host processor 112 and the authentication IC acts as a bottle neck that hinders shortening of the authentication time.

BRIEF DESCRIPTION OF THE DRAWINGS

The invention, together with objects and advantages thereof, may best be understood by reference to the following description of the presently preferred embodiments together with the accompanying drawings in which:

FIG. 3A is a schematic diagram of a single-sensor type authentication system that uses an electrode plate arranged in a subject product (e.g., battery pack) and an electric field sensor arranged in a main body (e.g., battery charger);

FIG. 3B is a schematic diagram of a single-sensor type authentication system that uses an electrode plate arranged in a main body (e.g., battery charger) and an electric field sensor arranged in a subject product (e.g., battery pack);

FIG. 4 is a schematic perspective view showing a sensor unit including a single electric sensor element;

FIG. 5 is a schematic perspective view showing a sensor unit including a plurality of electric sensor elements;

FIG. 6A is a schematic perspective view showing a sensor unit (electric field sensor and electrode plate) applied to a recording disc and a drive device; and FIG. 6B is an enlarged view showing an electrode plate of FIG. 6A.

DETAILED DESCRIPTION OF THE PREFERRED EMBODIMENTS

Figure 1:
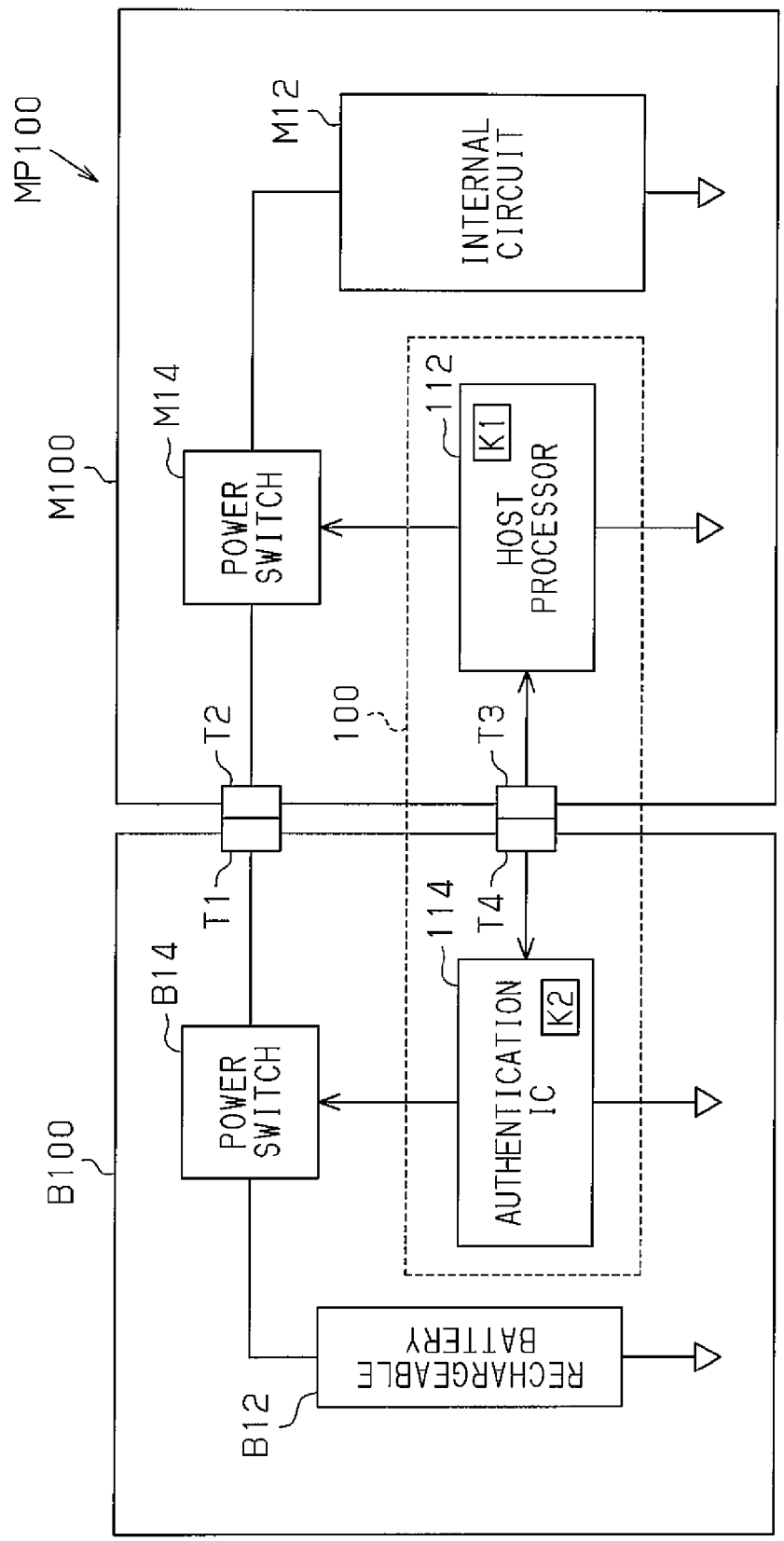
FIG. 1 is a block diagram showing an electronic device (e.g., mobile phone) incorporating an authentication system of the prior art.

In the drawings, like numerals are used for like elements throughout.

The present invention provides an authentication system that reduces power consumption during the authentication process and shortens the authentication time.

One aspect of the present invention is an authentication system including an electrode plate having a unique shape that defines an authentication key. An electric field sensor detects capacitance that is in correspondence with the shape of the electrode plate and generates a detection signal. A signal monitor compares the detection signal of the electric field sensor with a preset signal and generates a determination signal indicating the comparison result.

A further aspect of the present invention is an authentication system for incorporation in a device including a main body and a subject product for use with the main body. The authentication system includes a first authentication unit and a second authentication unit. The first authentication unit includes a first electrode plate, a first electric field sensor, and a first signal monitor. The first electrode plate is arrangeable on the subject product and has a unique shape that defines a first authentication key. The first electric field sensor is arrangeable on the main body and detects capacitance corresponding to the shape of the first electrode plate to generate a first detection signal. The first signal monitor is arrangeable on the main body and compares the first detection signal with a first preset signal to generate a first determination signal indicating the comparison result. The second authentication unit includes a second electrode plate, a second electric field sensor, and a second signal monitor. The second electrode plate is arrangeable on the main body and has a unique shape that defines a second authentication key. The second electric field sensor is arrangeable on the subject product and detects capacitance corresponding to the shape of the second electrode plate to generate a second detection signal. The second signal monitor is arrangeable on the subject product and compares the second detection signal with a second preset signal to generate a second determination signal indicating the comparison result.

Other aspects and advantages of the present invention will become apparent from the following description, taken in conjunction with the accompanying drawings, illustrating by way of example the principles of the invention.

Figure 2:
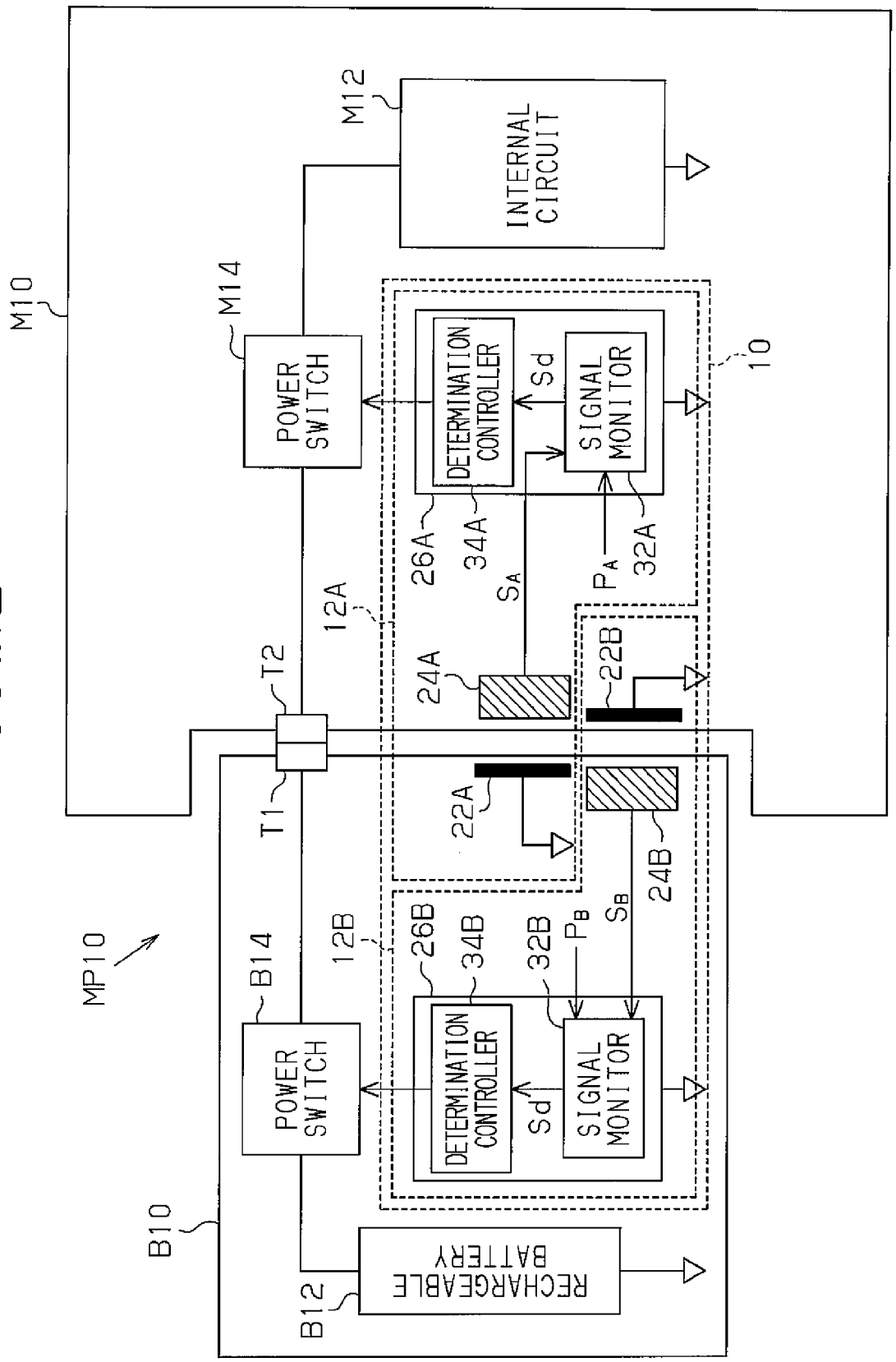
FIG. 2 is a block diagram showing an electronic device (e.g., mobile phone) incorporating a preferred embodiment of an authentication system according to the present invention.

A preferred embodiment of an authentication system 10 according to the present invention will now be discussed. FIG. 2 is a block diagram showing a device MP10 implementing the authentication system 10. The device MP10 is, for example, a mobile phone and will hereafter be referred to as the mobile phone MP10. The mobile phone MP10 includes a main body M10 (e.g., battery charger) and a battery pack B10 (subject product). The main body M10 and the battery pack B10 are connected to each other by terminals T1 and T2. In the same manner as is shown in FIG. 1, in the mobile phone MP10, when two power switches M14 and B14 are both activated, a charging path is formed between a rechargeable battery B12 of the battery pack B10 and an internal circuit M12 (charging circuit) of the main body M10 so that the rechargeable battery B12 becomes chargeable.

The authentication system 10 includes a first authentication unit 12A and a second authentication unit 12B. The first and second authentication units 12A and 12B have substantially identical configurations. The first authentication unit 12A will first be described.

The first authentication unit 12A includes an electrode plate 22A, a sensor element 24A, and an authentication circuit 26A. The electrode plate 22A is arranged in the battery pack B10. Preferably, the electrode plate 22A is arranged close to or in contact with an inner surface of an outer case (hereafter, referred to as the battery case) of the battery pack B10. The electrode plate 22A has a unique shape that defines an authentication key (product key) of the battery pack B10.

The sensor element 24A and the authentication circuit 26A are both arranged in the main body M10. An electric field sensor is used as the sensor element 24A. Preferably, the sensor element 24A is arranged close to or in contact with an inner surface of an outer case (hereafter, referred to as the main body case) of the main body M10. More specifically, the sensor element 24A is arranged at a position facing toward the electrode plate 22A of the battery pack B10 that is connected to the main body M10. The sensor element 24A and the electrode plate 22A are physically and electrically disconnected from each other. Further, there are no connection terminals arranged between the sensor element 24A and the electrode plate 22A. That is, there is no current path existing between the sensor element 24A and the electrode plate 22A. The sensor element 24A detects capacitance that is in correspondence with the shape of the electrode plate 22A (specifically, the distance between the electrode plate 22A and the sensor element 24A) and generates a detection signal $S_A$. The detection signal $S_A$ is provided to the authentication circuit 26A.

The authentication circuit 26A includes a signal monitor 32A and a determination controller 34A. The signal monitor 32A is provided with a preset signal $P_A$ in addition to the detection signal $S_A$ from the sensor element 24A. The signal monitor 32A compares the preset signal $P_A$ and the detection signal $S_A$ to generate a determination signal Sd that indicates the comparison result (i.e., whether or not the detection signal $S_A$ matches the preset signal $P_A$). The determination controller 34A generates a switch signal based on the determination signal Sd. More specifically, when the detection signal $S_A$ matches the preset signal $P_A$, the determination controller 34A generates a switch signal that activates the power switch M14.

In the same manner as the first authentication unit 12A, the second authentication unit 12B includes an electrode plate 22B, a sensor element 24B, and an authentication circuit 26B. However, the second authentication unit 12B differs from the first authentication unit 12A in that the electrode plate 22B is shaped differently from the electrode plate 22A. The electrode plate 22B has a unique shape that defines an authentication key (main body key) of the main body M10.

The sensor element 24B and the electrode plate 22B are physically and electrically disconnected from each other, and there are no connection terminals arranged between the sensor element 24B and the electrode plate 22B. That is, there is no current path existing between the sensor element 24B and the electrode plate 22B. The sensor element 24B detects capacitance that is in correspondence with the shape of the electrode plate 22B (specifically, the distance between the electrode plate 22B and the sensor element 24B) and generates a detection signal $S_B$. The detection signal $S_B$ is provided to the authentication circuit 26B.

In the same manner as the authentication circuit 26A, the authentication circuit 26B includes a signal monitor 32B and a determination controller 34B. The signal monitor 32B is provided with the detection signal $S_B$ from the sensor element 24B and a preset signal $P_B$. The signal monitor 32B compares the preset signal $P_B$ and the detection signal $S_B$ to generate a determination signal Sd that indicates whether or not the detection signal $S_B$ matches the preset signal $P_B$). The determination controller 34B generates a switch signal based on the determination signal Sd. More specifically, when the detection signal $S_B$ matches the preset signal $P_B$, the determination controller 34B generates a switch signal that activates the power switch B14.

The authentication system 10 is a dual-sensor type authentication system that includes two sensor elements 24A and 24B. In the authentication system 10, when the detection signal $S_A$ matches the preset signal $P_A$ and the detection signal $S_B$ matches the preset signal $P_B$, the power switches M14 and B14 are both activated. In other words, the authentication system 10 permits charging of the rechargeable battery B12 only when mutual authentication between the rechargeable battery B12 and the battery pack B10 is established. The authentication system 10 may also be a single-sensor type authentication system as shown in FIGS. 3A and 3B. FIG. 3A shows the authentication system 10 including only the first authentication unit 12A of FIG. 2 (only the electrode plate 22A and the sensor element 24A). FIG. 3B shows the authentication system 10 including only the second authentication unit 12B of FIG. 2 (only the electrode plate 22B and the sensor element 24B). Accordingly, the authentication system 10 performs authentication with at least one electric field sensor.

The structures of the electrode plate 22A (22B) and the sensor element 24A (24B) will now be described in detail. FIG. 4 is a schematic perspective view showing a sensor unit including a sensor element 40 (electric field sensor), which is formed by a single electric field sensor element, and an electrode plate 42. The electrode plate 42 is one example of the electrode plate 22A (or 22B) shown in FIG. 2, and the sensor element 40 is one example of the sensor element 24A (or 24B) shown in FIG. 2. FIG. 4 shows a state in which the outer cover (not shown) is removed from the electrode plate 42.

Referring to FIG. 4, the electrode plate 42 includes a three-dimensional pattern of lands and pits. The pattern is uniquely shaped for each authentication key (main body key or product key). For example, the three-dimensional pattern includes a plurality of electrode blocks 42a, 42b, 42c, 42d, . . . having different dimensions in X, Y, and Z directions. Such a unique design is required to prevent illegal copying of the electrode plate 42. The electrode plate 42 is formed so that the pattern breaks when it is dismantled (e.g., removed from the outer cover). The sensor element 40 detects capacitance that is in correspondence with the shape of the electrode plate 42. In this case, the electrode plate 42 has a unique shape as described above. Thus, the capacitance detected by the sensor element 40 is in correspondence with the shape and thus also unique. The sensor element 40 of FIG. 4 detects a single capacitance corresponding to the shape of the electrode plate 42 and outputs the capacitance as the detection signal $S_{40}$ (i.e., the detection signal $S_A$ or $S_B$ shown in FIG. 2).

FIG. 5 shows another sensor element 50, which is formed by a plurality (for example, nine) electric field elements 52. The sensor element 50 is one example of the sensor element 24A (or 24B) shown in FIG. 2. The electric field sensors 52 of the sensor element 50 detect different parts of the shape of the electrode plate 42. More specifically, the electric field sensor elements 52 each detect a partial capacitance for the shape of the corresponding part of the electrode plate 42. Accordingly, the sensor element 50 of FIG. 5 generates nine sub-detection signals $S_{52}$ for the shape of the electrode plate 42. Then, the sensor element 50 outputs the nine sub-detection signals $S_{52}$ as a single detection signal $S_{50}$ (the detection signal $S_A$ or $S_B$ shown in FIG. 2). When using the sensor element 50 of FIG. 5 as the sensor element 24A (24B) of FIG. 2, the signal monitor 32A (32B) generates a nine-bit detection pattern based on the detection signal $S_{50}$ (nine sub-detection signals $S_{52}$). Then, the signal monitor 32A (32B) compares the detection pattern with a preset signal (in this case, a nine-bit preset pattern). Accordingly, the signal monitor 32A (32B) performs pattern analysis with a high resolution. Thus, it is difficult for a third person to analyze the detection signals $S_A$ and $S_B$.

The authentication system 10 has the advantages described below.

A current path is not formed between the electrode plate 22A (22B) and the sensor element 24A (24B). That is, the authentication system 10 executes the authentication process without performing electrical communication between the main body M10 and the battery pack B10. Accordingly, power is not consumed by electrical communication. This reduces the power that is consumed to execute the authentication process.

The authentication system 10 does not perform electrical communication (mutual communication) between the main body M10 and the battery pack B10. This shortens the authentication time and consequently enables quick activation of the electronic device.

The electrode plate 22A (22B) has a three-dimensional pattern formed by pits and lands. This enables a unique authentication key to be defined in the electrode plate 22A.

The electrode plate 22A is broken when dismantled. This prevents a third person from illegally copying the shape.

The sensor element 24A (24B) can be formed from the single electric field sensor element 40. This simplifies the structure of the signal monitor 32A (32B).

The sensor element 24A (24B) can be formed from the plurality of electric field elements 52. In this case, the signal monitor 32A (32B) performs pattern analysis with a high resolution. This makes it difficult for a third person to analyze the detection signals $S_A$ and $S_B$ of the sensor elements 24A and 24B.

When used as a dual-sensor authentication system, the authentication system can perform mutual authentication between the main body M10 and the battery pack B10.

It should be apparent to those skilled in the art that the present invention may be embodied in many other specific forms without departing from the spirit or scope of the invention. Particularly, it should be understood that the present invention may be embodied in the following forms.

The authentication system 10 is not limited to the mobile phone MP10 and may be incorporated in other types of portable electronic devices such as a laptop computer.

In addition to portable electronic devices, the authentication system 10 may be applied to other types of equipment. For example, the authentication system 10 may be applied to a printer. In such a case, for example, the electrode plate 22A is arranged on an ink cartridge (subject product), and the sensor element 24A and authentication circuit 26A are arranged on a main body of the printer. When the ink cartridge is connected to the main body of the printer, the authentication circuit 26A uses the sensor element 24A to read an authentication key (product key of the ink cartridge) from the electrode plate 22A. Based on the detection result of the sensor element 24A, the authentication system 10 determines whether or not the ink cartridge is authentic.

As shown in FIGS. 6A and 6B, the authentication system 10 may be applied to a disc driver including a drive device 64 and a recording disc 66 (e.g., CD or DVD) that is usable with the drive device 64. In this case, the "main body" corresponds to the drive device 64, and the "subject product corresponds to the recording disc 66. Referring to FIG. 6A, an electrode plate 62 is arranged on the recording disc 66, and a sensor element 60 (electric field sensor) is arranged on the drive device 64. Referring to FIG. 6B, the electrode plate 62 is formed in the same manner as the electrode plate 42 shown in FIGS. 4 and 5. The sensor element 60 is formed by a plurality of electric field sensor elements 52 as shown in FIG. 5 to generate a detection signal $S_{60}$, which includes a plurality of sub-detection signals. In this case, a signal monitor (not shown) such as that shown in FIG. 2 generates a multiple-bit detection pattern based on the detection signal $S_{60}$ of the sensor element 60. Further, the signal monitor further compares the detection pattern with a preset signal (multiple-bit preset pattern) to generate the determination signal Sd. More specifically, the authentication system 10 applied to the disc driver uses the sensor element 60 of the drive device 64 to read the authentication key (product key of the recording disc 66) from the electrode plate 62 on the recording disc 66. Accordingly, the authentication system 10 can read the product key just by placing the recording disc 66 on a disc tray (not shown) and does not have to rotate the recording disc. In the authentication system of the prior art, a recording disc is rotated to read a product key from the recording disc. This results in a large amount of power consumption. Further, a mechanism for rotating the recording disc such as a motor must be driven. This lengthens the authentication time. The authentication system 10 solves such problems.

The present examples and embodiments are to be considered as illustrative and not restrictive, and the invention is not to be limited to the details given herein, but may be modified within the scope and equivalence of the appended claims.

What is claimed is:

1. An authentication system comprising:
   an electrode plate having a unique shape that defines an authentication key;
   an electric field sensor for detecting capacitance that is in correspondence with the shape of the electrode plate and generating a detection signal; and
   a signal monitor for comparing the detection signal of the electric field sensor with a preset signal and generating a determination signal indicating the comparison result.

2. The authentication system according to claim 1, wherein the electrode plate includes a three-dimensional pattern of pits and lands shaped uniquely to define the authentication key.

3. The authentication system according to claim 2, wherein the three-dimensional pattern includes a plurality of electrode blocks.

4. The authentication system according to claim 1, wherein the electrode plate is formed to break when dismantled.

5. The authentication system according to claim 1, wherein the electric field sensor is formed by a single electric field sensor element that detects a single capacitance corresponding to the shape of the electrode plate.

6. The authentication system according to claim 1, wherein the electric field sensor includes a plurality of electric field sensor elements detecting different parts of the shape of the electrode plate.

7. The authentication system according to claim 6, wherein:
   the plurality of electric field sensor elements each detect a partial capacitance for the corresponding part of the shape of the electrode plate; and
   the signal monitor generates a multiple-bit detection pattern based on the sub-detection signals of the plurality of electric field sensor elements and compares the multiple-bit detection pattern with the preset signal.

8. The authentication system according to claim 1, wherein:
   the authentication system is incorporated in a device including a main body and a subject product for use with the main body;
   the electrode plate is arranged on either one of the main body and the subject product; and
   the electric field sensor and the signal monitor are arranged on the subject product when the electrode plate is arranged on the main body, and the electric field sensor and the signal monitor are arranged on the main body when the electrode plate is arranged on the subject product.

9. The authentication system according to claim 8, wherein:
   the device is an electronic device including a battery charger and a battery pack detachably connected to the battery charger;
   the main body is the battery charger; and
   the subject product is the battery pack.

10. An authentication system for incorporation in a device including a main body and a subject product for use with the main body, the authentication system comprising:
    a first authentication unit; and
    a second authentication unit;
    wherein the first authentication unit includes:
      a first electrode plate arrangeable on the subject product and having a unique shape that defines a first authentication key;
      a first electric field sensor, arrangeable on the main body, for detecting capacitance corresponding to the shape of the first electrode plate to generate a first detection signal; and
      a first signal monitor, arrangeable on the main body, for comparing the first detection signal with a first preset signal to generate a first determination signal indicating the comparison result; and the second authentication unit includes:
      a second electrode plate arrangeable on the main body and having a unique shape that defines a second authentication key;
      a second electric field sensor, arrangeable on the subject product, for detecting capacitance corresponding to the shape of the second electrode plate to generate a second detection signal; and
      a second signal monitor, arrangeable on the subject product, for comparing the second detection signal with a second preset signal to generate a second determination signal indicating the comparison result.

* * * * *